United States Patent Office 2,868,325
Patented Jan. 13, 1959

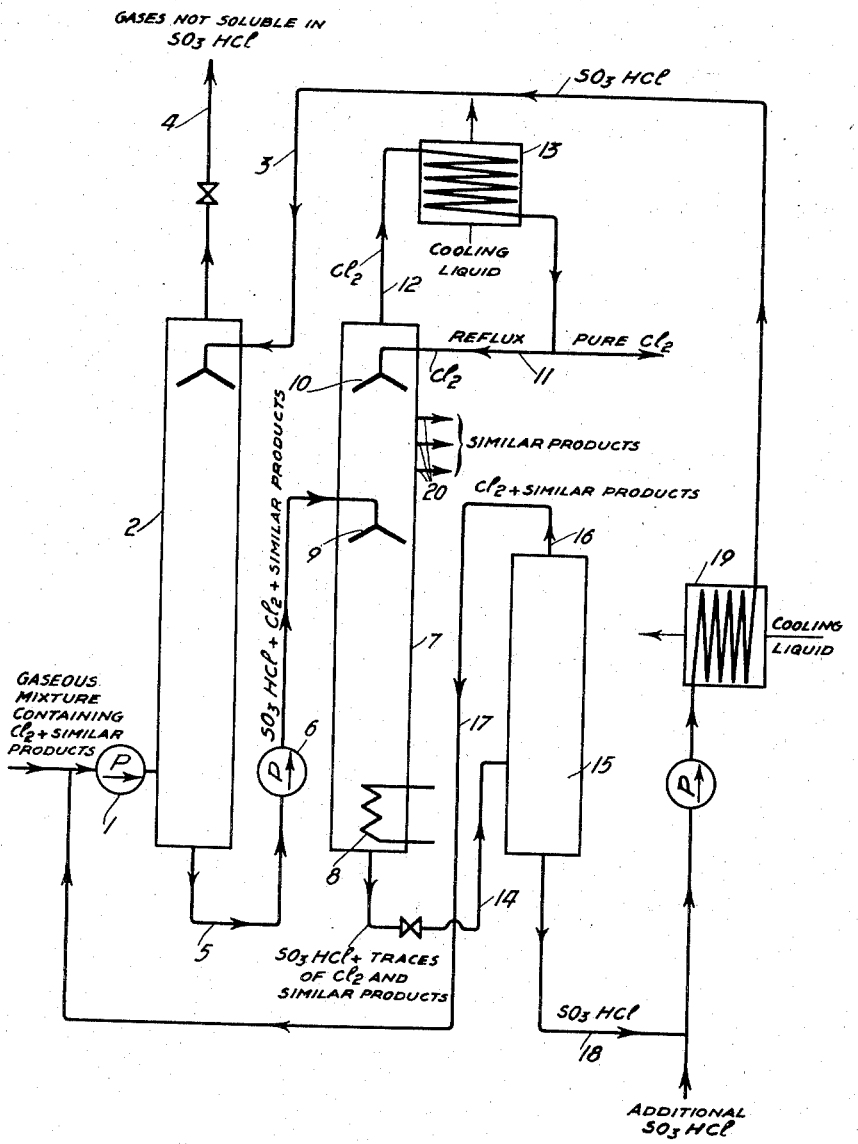

2,868,325

METHOD OF EXTRACTION OF CHLORINE FROM GASEOUS MIXTURES

Marie Edouard Joseph Cathala, Toulouse, France

Application July 12, 1956, Serial No. 597,355

Claims priority, application France February 29, 1956

13 Claims. (Cl. 183—115)

The present invention relates to a method of extraction of chlorine from gaseous mixtures.

It is known that very many industrial operations leave as a residue a mixture of gases which is more or less charged with chlorine, since even the liquefaction of chlorine obtained by electrolysis, in spite of its high degree of purity, comprised between 98 and 99%, does not permit of an efficiency exceeding 95 to 97% being obtained. In addition, it must be observed that this liquefaction necessitates high pressures (8 kg. absolute) or the simultaneous use of lower pressures (2.5 kg. absolute) and low temperatures (−10 to −15° C.).

A large number of chlorination processes yield mixtures containing from 10 to 50% of chlorine together with other residual gases, and the elimination of these residues, which are dangerous because of their chlorine content, makes a treatment with lime or alkaline lyes necessary and gives a product of only mediocre value. Chlorine is, for example, often obtained from the electrolysis of aqueous sodium chloride. In addition to chlorine, the resultant gaseous mixture also contains other volatile gases such as carbon dioxide, hydrogen, nitrogen and oxygen.

At the present time, there is not available in industry a solvent permitting of the recovery of this chlorine, the consumption of which is continually increasing. The organic solvents are too costly and too volatile. As regards water, this has only a fair solvent power, since when the chlorine is under a pressure of 760 mm. of mercury, 100 grams of water only dissolve 0.7 gram of chlorine at 20° C., 1 gram at 10° C., and 1.5 grams at 0° C. In his attempts to find an inorganic solvent which is anhydrous and only slightly volatile, the applicant has found that chloro-sulfonic acid has a solvent power which enables it to be applied with advantage to the extraction of gaseous chlorine from the mixtures which contain this chlorine.

The invention thus has for its object to provide a method which enables chlorine to be extracted as completely as possible from the mixtures referred to above. The said method consists essentially in dissolving the chlorine, contained in a mixture of gases, in chloro-sulfonic acid, maintained preferably at a low temperature, and in de-gasifying the solution thus obtained in a tower or in a de-gasifying apparatus of known type, in which a suitable temperature gradient and pressure are maintained, and then in expanding the hot chloro-sulfonic acid passing out of the de-gasifying apparatus in an appropriate apparatus, in any known manner.

It will very readily be understood from the table given below that this method has great advantages, the table giving the solubility of chlorine in 100 grams of chloro-sulfonic acid as a function of its temperature and of its partial pressure in millimeters of mercury.

| Partial pressure of the chlorine | Temperature (in degrees centigrade) | | | | | |
|---|---|---|---|---|---|---|
| | 20° | 10° | 0° | −10° | −20° | −30° |
| 760 mm | G. 10 | G. 13.5 | G. 17.5 | G. 25 | G. 33 | G. 200 |
| 400 mm | 2.5 | 4 | 7 | 9.5 | 14 | 22 |
| 200 mm | 0.8 | 1 | 1.5 | 3 | 6 | 10 |
| 100 mm | | | 0.15 | 0.4 | 1.3 | 3 |

This table shows that the chloro-sulfonic acid is an extremely useful solvent for the extraction of chlorine from gaseous mixtures which contain this chlorine.

As the melting point of chloro-sulfonic acid is in the vicinity of −80° C., this solvent may be utilised to extract from a gaseous mixture the last traces of chlorine which remain totally miscible therewith up to the melting point. Its use can be of particular advantage when the chlorine is mixed with volatile products which are also soluble, such as numerous chlorinated derivatives which are cited by way of example and without any implied limitation. These products are thus extracted at low temperature and may be recovered after separation from the chlorine, in consequence of their lower volatility.

As the volatility of chloro-sulfonic acid is very low, the losses of solvent by being carried away in the inert gases, freed from chlorine or from soluble compounds, are generally negligible. In certain cases however, for example when the insoluble compounds are of industrial value, it is possible to free them from all traces of sulfur compounds, by decomposing the chloro-sulfonic acid by means of concentrated sulfuric acid, the strength of which will be maintained equal to or less than 97%; the traces of hydrochloric acid gas thus freed may be extracted, if so desired, either by alkaline lyes or simply by water.

The special advantages accruing from the use of chloro-sulfonic acid are shown in the two examples below, which are not in any way limitative, of the application of the method which forms the object of the invention. The figure shows diagrammatically a device for carrying out the process described in the following examples.

Example 1

Chlorine obtained by the electrolysis of aqueous sodium chloride instead of being compressed to 8 kg. absolute (the pressure required for its liquefaction by ordinary water) is simply compressed to 2.5 kg. absolute by pump 1. After the chlorine has been dried and cooled, as may be required, it is passed into one or a number of absorption towers 2 or into any suitable contact apparatus in which it is dissolved in chloro-sulfonic acid arriving by duct 3 and maintained at ordinary temperature or cooled to the vicinity of 0° C., the impurities from said chlorine insoluble in SO₃HCl leaving said tower 2 by valved duct 4. The work required for compression may thus be reduced in the ratio of 3 to 1. The solvent action can be carried out in one or a number of stages.

The saturated solution is then pumped through duct 5 and pump 6 to the upper portion of a de-gasifying tower 7 in which the chlorine is liberated from the solution by increasing the temperature (to 80 to 100° C. for example) by heater 8. The working pressure of this column is maintained in the vicinity of 8 kg. absolute or at any pressure which is sufficient for the chlorine to be liquefied in a condenser supplied with water.

Above the point 9 at which the column 7 is supplied with solution, said column 7 may be provided with a rectifying section 10 in which the chlorine may be freed from all traces of chloro-sulfonic acid by means of a suitable reflux of liquid chlorine arriving by duct 11 receiving a portion of the chlorine issuing by duct 12 and condensed in cooler 13.

The hot solution of $SO_3HCl$, which is almost exhausted, is expanded at its outlet from the column 7 by valved duct 14 in an expansion device 15, either at the working pressure of the absorption apparatus 2, or at atmospheric pressure. In this way, it is freed from the last traces of dissolved chlorine, the gases liberated at 16 being passed by duct 17 to the corresponding stage of the absorption unit 2, whilst the chloro-sulfonic acid leaving by duct 18 is cooled in cooler 19 and passed to the top of the absorption apparatus 2 by duct 3.

*Example 2*

The gases containing chlorine contaminated with other gases which are soluble in chloro-sulfonic acid, for example phosgene, or other volatile chlorinated compounds of carbon, are eventually dried and compressed in order to give the chlorine a sufficient partial pressure. After cooling, the gases are directed by pump 1 to absorption tower 2 in which they are treated by chloro-sulfonic acid cooled to a suitable temperature arriving by duct 3. The choice of the pressure and of the temperature of the solvent stage is determined by the relative cost of the compression and cooling. The gases are thus freed from chlorine and from valuable volatile constituents leaving by valved duct 4.

The solution of the soluble gases in $SO_3HCl$ is then passed into a de-gasifying apparatus 7, in which the pressure is adjusted in order that the chlorine may be liquefiable at a temperature in the vicinity of that chosen for the absorption. A suitable gradient of temperature in the de-gasifying apparatus enables the compounds dissolved in the chloro-sulfonic acid to be separated into different fractions which it is possible to separate into pure and liquid constituents, if so desired by means of separate exits 20.

The hot chloro-sulfonic acid leaving the de-gasifying apparatus 7 by duct 14 is then expanded in an expansion device 15 to the pressure chosen for the absorption, or to a lower pressure. The last traces of volatile constituents thus separated in the device 15 are re-introduced by duct 17 at a suitable point of the absorption unit 2. After cooling in cooler 19, the chloro-sulfonic acid is also returned to the absorption unit 2 by duct 3.

What I claim:

1. A method of extracting chlorine from a gaseous mixture containing chlorine resulting from the electrolysis of aqueous sodium chloride, which comprises contacting said gaseous mixture with a stream of cold chloro-sulfonic acid, thereby dissolving in said stream at least a major portion of the chlorine contained in said mixture, compressing and distilling said stream containing chlorine dissolved therein, thereby separating gaseous chlorine from said stream, and expanding said stream substantially stripped from chlorine.

2. A method of extracting chlorine as claimed in claim 1, further comprising compressing said gaseous mixture to a pressure not substantially above 2.5 kg./cm.$^2$ absolute before contacting said mixture with said stream.

3. A method of extracting chlorine as claimed in claim 1, further comprising compressing said gaseous mixture to a pressure not substantially above 2.5 kg./cm.$^2$ absolute and drying and cooling the compressed mixture before contacting said mixture with said stream.

4. A method of extracting chlorine as claimed in claim 1, wherein said stream is maintained at a temperature of about 0° C. while contacting said stream with said gaseous mixture.

5. A method of extracting chlorine from a gaseous mixture containing chlorine resulting from the electrolysis of aqueous sodium chloride, which comprises compressing said gaseous mixture at a pressure of about 2.5 kg./cm.$^2$ absolute, drying and cooling the compressed mixture, contacting said gaseous mixture with a stream of cold chloro-sulfonic acid, thereby dissolving in said stream at least a major portion of the chlorine contained in said mixture, compressing at a pressure of about 8 kg./cm.$^2$ absolute and heating said stream containing chlorine dissolved therein, thereby separating by a distillation step from said stream the gaseous chlorine contained therein, and expanding said stream substantially stripped from chlorine.

6. A method of extracting chlorine as claimed in claim 5, wherein said stream substantially stripped from chlorine is expanded at a pressure substantially equal to 2.5 kg./cm.$^2$ absolute.

7. A method of extracting chlorine as claimed in claim 5, wherein said stream substantially stripped from chlorine is expanded to atmosphere pressure.

8. A method of extracting chlorine as claimed in claim 5, wherein said gaseous stream containing chlorine dissolved therein is heated at a temperature of about 80° to 100° C. for performing said distillation step.

9. A method of extracting chlorine as claimed in claim 5, further comprising condensing a portion of said gaseous chlorine separated in said distillation step and refluxing the condensed portion during said distillation step.

10. A method of extracting chlorine as claimed in claim 5, further comprising recycling the chlorine liberated in the expansion step to the contacting operation, and cooling and recycling the expanded stream for a new contacting operation with a fresh body of gaseous mixture containing chlorine.

11. A method of extracting chlorine from a gaseous mixture containing chlorine and at least one additional volatile product of the class consisting of carbon dioxide, hydrogen, nitrogen and oxygen, which comprises compressing said gaseous mixture at a pressure of about 2.5 kg./cm.$^2$ absolute, drying and cooling the compressed mixture, contacting said gaseous mixture with a stream of cold chloro-sulfonic acid, thereby dissolving in said stream at least a major portion of the chlorine and said other volatile products contained in said mixture, compressing at a pressure of about 8 kg./cm.$^2$ absolute and heating said stream containing chlorine and said other volatile products dissolved therein, thereby separating by a distillation step from said stream the gaseous chlorine and said other volatile products contained therein, and expanding said stream substantially stripped from chlorine and said other volatile products.

12. A method of extracting chlorine and said other volatile products soluble in chloro-sulfonic acid as claimed in claim 11, wherein said distillation step is a fractional distillation step separating from said stream different fractions of chlorine and said other volatile products.

13. A method of extracting chlorine and said other volatile products soluble in chloro-sulfonic acid as claimed in claim 11, further comprising recycling the chlorine and said other volatile products liberated in the expansion step to the contacting operation, and cooling and recycling the expanded stream for a new contacting operation with a fresh body of gaseous mixture containing chlorine and said other volatile products.

References Cited in the file of this patent

UNITED STATES PATENTS 2,540,905    Neubauer et al. _____ Feb. 6, 1951

OTHER REFERENCES

Solubilities of Inorganic and Organic Compounds by A. Seidell, vol. 1, 2nd edition, Van Nostrand Co., N. Y., 1919, page 247.